May 24, 1966     H. KORRENN ETAL     3,252,745
ANTIFRICTION BEARINGS PROVIDED WITH BUILT-IN FEELER MEANS
Filed Nov. 8, 1963     2 Sheets-Sheet 1

Inventors
Heinz Korrenn
Willi Kirchner
By Stevens, Davis, Miller & Mosher
Attorneys May 24, 1966 H. KORRENN ETAL 3,252,745
ANTIFRICTION BEARINGS PROVIDED WITH BUILT-IN FEELER MEANS
Filed Nov. 8, 1963 2 Sheets-Sheet 2

United States Patent Office 3,252,745
Patented May 24, 1966

3,252,745
ANTIFRICTION BEARINGS PROVIDED WITH BUILT-IN FEELER MEANS
Heinz Korrenn, Schweinfurt, and Willi Kirchner, Schwebheim, Germany, assignors to Kugelfischer Georg Schafer & Co., Schweinfurt, Germany
Filed Nov. 8, 1963, Ser. No. 322,288
Claims priority, application Germany, Nov. 21, 1962,
K 48,279
5 Claims. (Cl. 308—173)

This invention relates to antifriction bearings which are provided with built-in feeler means serving a purpose to be elucidated presently.

For the proper application of antifriction bearings, it is necessary to provide antifriction bearings which differ in regard to the clearances existing therein so as to make it possible to take into consideration the various classes of fits and the different operating conditions to be met in each individual case when selecting ball or roller bearings for a given application. The use of different clearance ranges has the purpose of ensuring a minimum operative play in each individual case. The provision of minimum play in an antifriction bearing will result in a satisfactory distribution of the load in the bearing and will ensure adequate concentricity of the parts supported by the bearing. In certain cases, for example, in the case of machine tool spindles, which are required to afford not only maximum precision and concentricity but also the highest possible amount of rigidity, the anti-friction bearings are fitted in such a manner that during operation they are subject to a certain amount of preload. In such a case, the distance between the race surfaces of the bearing is smaller than the diameter of the rolling bodies in their unloaded condition. Particularly, in the case of such a preloaded antifriction bearing even a small change in the preload will result in a considerable change in the forces transmitted at the contact areas between the races and the rolling bodies, because the antifriction bearing acts in the same manner as a spring of extremely high rate.

It has been known to use feeler gages to measure the clearance existing in an antifriction bearing, whether mounted in position or not, while the bearing is at rest. In the case of a bearing mounted in position, the associated shaft is then moved in a radial or axial direction, the amount of displacement of the shaft being measured with the aid of dial indicators or other known instruments. In the case of antifriction bearings, however, which are either in operation or which are preloaded, i.e., which have a so-called negative clearance or play, it is impossible to use the measuring instruments mentioned above, nor would it be possible to measure a bearing play in the order of magnitude of a few thousandths of a millimeter or a few ten-thousandths of an inch.

According to the invention, the aforementioned deficiencies are eliminated by the provision, within an antifriction bearing, of stationary feeler means adapted to operate mechanically, optically, electrically, electronically or pneumatically in a per se known manner and permitting the distance between the bearing races to be measured with high accuracy. According to a specific feature of the invention, the said measuring means are constituted by pin-shaped bodies whose measuring surfaces are of spherical shape. It is of particular advantage to provide for the feeler means to be engaged only during the actual measuring operation, further to provide for the feeler means to be guided in a play-free manner by means of blade springs, and to give the feeler means a length which is smaller than the diameter of one of the rolling bodies of the bearing. Preferably the feeler means will be accommodated in the stationary bearing race in such a manner as to co-operate with the race surface of the second race or with one of the rolling bodies. The feeler means are arranged, in a per se known manner, to provide control signals permitting either the play or the preload of the bearing to be ascertained.

Other objects and features of the invention will become apparent as the description proceeds, especially when taken in conjunction with the accompanying drawing, illustrating a preferred embodiment of the invention, wherein.

Figure 1:
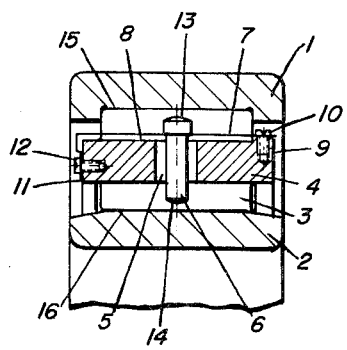
FIG. 1 is a fragmentary cross-sectional view of a cylindrical roller bearing provided with single-piece feeler means according to the invention.

In the embodiment of FIG. 1, there is provided, between an outer race 1 and an inner race 2, a circular array of rollers, of which one roller 3 is shown. A roller cage 4 serves to maintain the rollers equidistantly spaced circumferentially. Between two adjacent rollers the cage 4 is provided with at least one radial hole 5 through which a measuring pin 6 extends which does not contact the walls of hole 5. The measuring pin 6 is mounted on a leaf spring 7 which is secured to the outer periphery 8 of cage 4 adjacent its end face 9 by means of a screw 10. The free end of leaf spring 7 extends beyond the opposite end face 11 of the cage and is clamped against end face 11 by means of a screw 12. The length of the measuring pin 6 whose contacting surfaces are designated by the reference numerals 13 and 14 is smaller than the diameter of roller 3. To determine the play or the preload of the bearing mounted in position, the following procedure is adopted: First the screw 12 is loosened; as a result, the gaging or contacting surface 13 of measuring pin 6 will be urged against the race surface 15 of outer race 1 by the action of leaf spring 7 which is biased towards outer race 1. The length of measuring pin 6 is selected in such a manner as to permit the distance between the gaging surface 14 of the pin and the race surface 16 of inner race 2 to be determined with the aid of an internal measuring instrument of known construction affording an accuracy of measuring of one-thousandth millimeter. Since the length of measuring pin 6 and the diameter of roller 3 are known, it is now possible accurately to determine the distance between the two race surfaces 15 and 16. This method permits either the play or the preload of the bearing to be determined. Upon completion of the measuring operation, the screw 12 is used to reclamp the leaf spring 7 to the roller cage 4 to ensure that the gaging surfaces 13 and 14 of measuring pin 6 are out of contact with the race surfaces 15 and 16 before the bearing is again put into operation.

Figure 2:
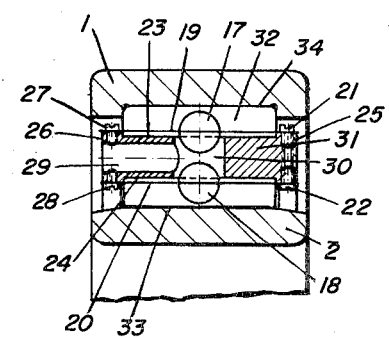
FIG. 2 is a fragmentary cross-sectional view of a cylindrical roller bearing provided with two-piece feeler means according to the invention.

FIG. 2 illustrates an embodiment of the invention in which a cylindrical roller bearing is provided with a two-piece measuring element. Accommodated in a hole 30 of roller cage 31 is a two-piece measuring means comprising two balls 17 and 18. Each of the two balls 17 and 18 is mounted in one of two leaf springs 19 and 20 secured to the outer diameter 23 and the inner diameter 24, respectively, of roller cage 31 by means of screws 21 and 22 located adjacent to end face 25 of the cage. The free ends of leaf springs 19 and 20 are adapted to be clamped to the opposite end face 26 of cage 31 with the aid of suitable means such as screws 27 and 28. From end face 26 there extends an axial bore 29 up to hole 30. The sum of the diameters of the two balls 17 and 18 is smaller than the diameter of the cylindrical roller 32. For the purpose of measuring the play or the preload of the bearing, the two screws 27 and 28 are loosened to free the leaf springs 19 and 20 and thus to permit the balls 17 and 18 to engage the inner race surface 33 and the outer race surface 34, respectively. Now there will be sufficient space left between the two balls 17 and 18 for the insertion of an internal measuring instrument of known construction. Upon completion of the measuring operation, the two screws 27 and 28 are used to reclamp the free ends of the two leaf springs so as to disengage the balls 17 and 18 from the race surfaces 33 and 34.

Figure 3:
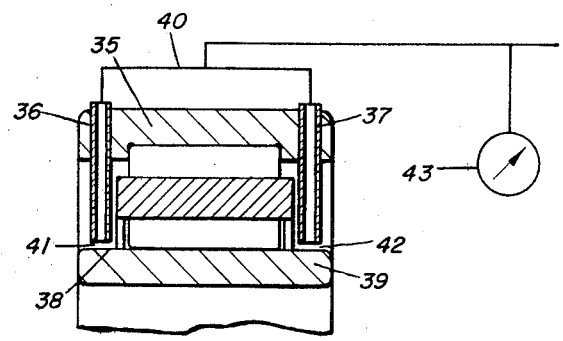
FIG. 3 is a fragmentary cross-sectional view of still another embodiment of the invention adapted to measure bearing play and/or preload either during operation of the bearing or while the bearing is at rest.

FIG. 3 illustrates an embodiment of the invention permitting the play or preload of a bearing to be measured also during operation of the bearing. Mounted in the outer race 35 are two radially inwardly extending measuring nozzles 36 and 37 whose inner ends face either a preferably cylindrical surface 38 of the rotating inner race 39, which surface may, as shown in FIG. 3, be constituted by a portion of the inner race surface itself. The measuring nozzles 36 and 37 form component parts of a pneumatic measuring circuit 40 of known construction. Depending on the width of the gaps 41 and 42 between the inner ends of the nozzles 36, 37 and the cylindrical race surface 38, a certain pressure will build up in the measuring circuit, this pressure being indicated by a pressure gage 43. As shown in FIG. 3, the nozzles are connected in the circuit in such a manner that an average is derived of the width of the two gaps. Preferably, the measuring nozzles are adjusted in such a manner that a zero indication of pressure gage 43 corresponds to race-to-race distance equalling the diameter of the rolling bodies or rollers.

Figure 4:
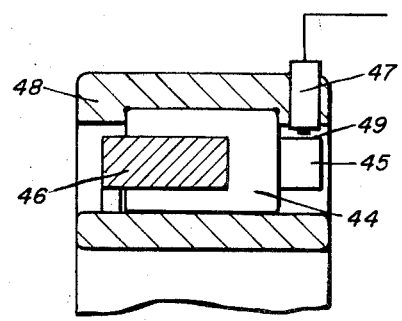
FIG. 4 is a fragmentary cross-sectional view of an embodiment of the invention in which the feeler means co-operate with a projection provided on one of the rolling bodies.

In special cases it may be desirable to determine the preload of an antifriction bearing preferably by measuring the distance between the stationary out race and a rolling body of suitable design. FIG. 4 shows a suitable embodiment of this type in conjunction with a cylindrical roller bearing. In this case, the roller 44 is provided at one end thereof with a cylindrical projection 45 of smaller diameter than the roller. The roller cage 46 of the bearing is of the comb type. The feeler means 47 is mounted in the outer race 48 and co-operates with the cylindrical periphery of projection 45. The measuring means may be adapted to operate in a known manner, for example, electronically, i.e., capacitively without physical contact, or pneumatically.

It is preferred to provide a plurality of pairs of measuring nozzles which are spaced circumferentially. According to another feature of the invention, there may be provided in the measuring circuit suitable signal generators operating in a known manner; such signal generators may be adapted, for example, upon some undesirable condition having developed, such as an excessively high preload, either to stop the machine of which the bearing forms a part or to initiate measures adapted to return the bearing to its normal condition of operation. It would thus be possible, for example, to cause cooling air to be blown through the affected bearing. It will be understood that the pneumatic feeler means may be replaced by electronic, optical or electric feeler means.

While several embodiments described herein are at present considered to be preferred, it is understood that various modifications and improvements may be made therein, and it is intended to cover in the appended claims all such modifications and improvements as fall within the true spirit and scope of the invention.

What is claimed is:

1. A feeler device in an antifriction bearing of the type having inner and outer races and a roller cage, said device comprising at least one feeler member disposed between said races, and normally fixed with respect to said cage and extending between said races out of contact therewith, and means adapted to urge said feeler member against the race surface of at least one of said races to permit measuring the distance between the races.

2. The device of claim 1 wherein there is one feeler member in form of an elongated rod, the length of which is less than the distance between said races.

3. The device of claim 2 wherein said means comprises a leaf spring with respect to which said feeler member is mounted, said spring having one end fixed with respect to the outer periphery of said cage and the other end removably secured thereto.

4. The device of claim 1 wherein there are two feeler members, each of which is in the form of a ball, the sum of the diameter of said balls being less than the distance between said races, said means being adapted to urge one of said balls against the inner surface of the outer race and the other of said balls against the outer surface of the inner race.

5. The device of claim 4 wherein said means comprises two leaf springs with respect to which said balls are respectively mounted, one end of each of said springs being respectively secured to the outer and inner periphery of said cage, the other end of each of said springs being respectively removably secured to said peripheries.

References Cited by the Examiner

UNITED STATES PATENTS 2,683,983 7/1954 Aller.
2,687,038 8/1954 Aller.

FOREIGN PATENTS 50,044 8/1919 Sweden.

DAVID J. WILLIAMOWSKY, *Primary Examiner.*

FRANK SUSKO, *Examiner.*